(12) United States Patent
Mejia

(10) Patent No.: US 11,089,219 B1
(45) Date of Patent: Aug. 10, 2021

(54) FIXED SELFI-DEVICE

(71) Applicant: Edward Alexander Mejia, Islamorada, FL (US)

(72) Inventor: Edward Alexander Mejia, Islamorada, FL (US)

( * ) Notice: Subject to any disclaimer, the term of this patent is extended or adjusted under 35 U.S.C. 154(b) by 0 days.

(21) Appl. No.: 17/246,621

(22) Filed: May 1, 2021

(51) Int. Cl.
| | |
|---|---|
| *H04N 5/232* | (2006.01) |
| *H04M 1/02* | (2006.01) |
| *G06Q 20/32* | (2012.01) |
| *G06K 7/14* | (2006.01) |
| *H04N 7/18* | (2006.01) |

(52) U.S. Cl.
CPC ..... *H04N 5/232411* (2018.08); *G06K 7/1417* (2013.01); *G06Q 20/3276* (2013.01); *H04M 1/0264* (2013.01); *H04N 7/183* (2013.01); H04M 2250/52 (2013.01)

(58) Field of Classification Search
CPC ............ H04N 5/23206; H04N 5/2252; H04N 1/00307; H04N 2213/001; H04N 5/23222; G06Q 30/00; H04M 1/04; H04M 2250/52
See application file for complete search history.

(56) References Cited

U.S. PATENT DOCUMENTS

| | | | |
|---|---|---|---|
| 2017/0026568 A1* | 1/2017 | Haehnichen | G06F 3/167 |
| 2018/0270410 A1* | 9/2018 | Lyle | H04N 7/183 |
| 2020/0142282 A1* | 5/2020 | Kaiser | G03B 15/03 |

* cited by examiner

*Primary Examiner* — Obafemi O Sosanya
(74) *Attorney, Agent, or Firm* — Ruben Alcoba, Esq.

(57) ABSTRACT

A selfi-device that allows a person to take a picture or video of him or herself at a remote and picturesque location. The selfi-device comprises of a housing that houses a solar photovoltaic system, a motor that attaches to a retractable arm, an articulated joint that is attached to the retractable arm, an adjustable clamp that is attached to the articulated joint, a light source that is attached to an outer portion of the housing, a processor that is composed of a transceiver, a memory and a program that allows a user to connect to a wireless network or satellite, the solar photovoltaic system is operative connected to the motor, the light source, and the processor. In a preferred embodiment of the present invention, the selfi-device will have at least one input source that will allow a user to activate the selfi-device.

6 Claims, 2 Drawing Sheets

FIXED SELFI-DEVICE

BACKGROUND

Figure 1:
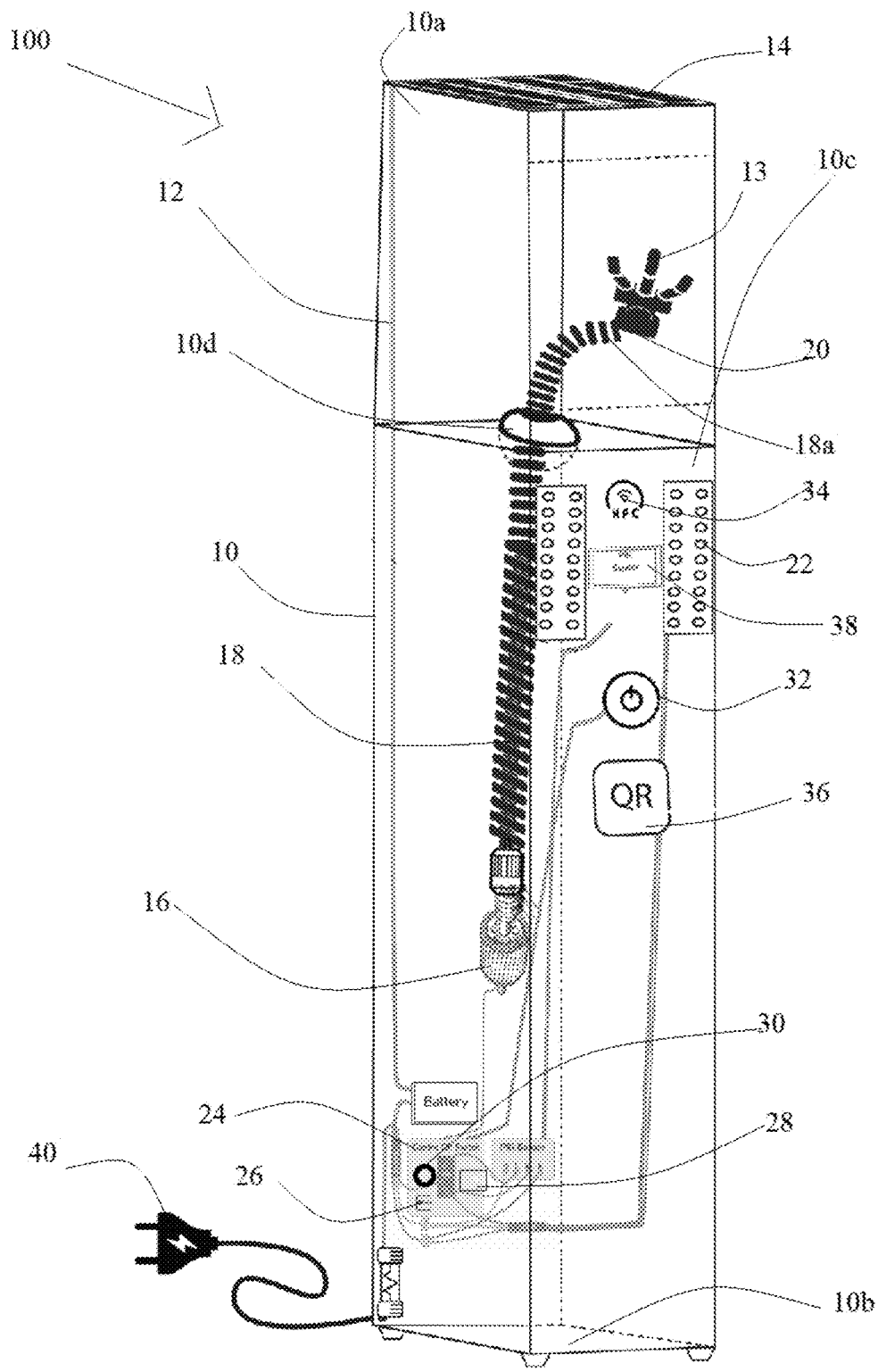

The present invention is a fixed selfi-device that will allow users to take pictures of themselves without having to ask a stranger to take the pictures at remote locations.

The inventor of the present invention conceived the invention on a trip when he realized that if he could take a scenic photograph or video of himself at a picturesque location without the assistance of a third party that his memory would be more vivid of the moment of when he took the picture at the location: more so, if he was able to capture the angle, the scene, and the location wherein he would position himself, then he would not have to entrust a stranger to capture his vision of the scene taken at, the location.

After conceiving the invention, he realized that in order to have the selfi-device installed at picturesque locations, than he would have to find a manner of powering and illuminating the selfi-device.

He also realized that the selfi-device had to have an articulating arm that would allow him to place a cellphone in the in the arm so that he could manipulate the angle, scene, and location of wherein he would position himself to take the picture that he conceived in his mind's eye.

He then realized that the self-device had to have a power source to provide night lighting at the scenic location. And next, he realized using the present technology that he could also immediately upload the picture to the cloud to conserve the picture taken and that the picture taken could also serve to provide a mark of when and where he took the picture.

Lastly, he realized that he had to find a manner of protecting the articulating arm when the selfi-device was not in use and how to fund the installation at public facilities without destroying the environment. The answer was simple, he simply had to provide a solar photovoltaic system to produce the energy needed to power the transceiver and the light source.

The selfi-device of the present invention addresses the need of requiring a third party to take a picture of yourself at a picturesque location.

SUMMARY

The present invention is a selfi-device that allows a person to take a picture or video of him or herself at a remote and picturesque location.

The self-device comprises of a housing that houses a solar photovoltaic system, a motor that attaches to a retractable arm, an articulated joint that is attached to the retractable arm, an adjustable clamp that is attached to the articulated joint, a light source that is attached to an outer portion of the housing, a processor that is composed of a transceiver, a memory and a program that allows a user to connect to a wireless network or satellite, the solar photovoltaic system is operative connected to the motor, the light source, and the processor. In a preferred embodiment of the present invention, the selfi-device will have at least one input source that will allow a user to activate the selfi-device.

An object of the present invention is to provide a selfi-device that will allow you to take pictures of yourself at, remote locations.

Another object of the present invention is to provide a selfi-device that will allow you to direct a picture of yourself taken at a remote location.

Yet another object of the present invention is to provide a selfi-device that will not require you to have others take pictures of yourself at a remote location.

Yet still another object of the present invention is to provide a selfi-device that will be able to record the place and time of wherein a user takes a picture and uploads it to the cloud. The uploading of the pictures will help authorities track the whereabouts of the user of the selfi-device when he or she is at remote location: this feature will serve to save lives when the user gets lost at a remote location.

DRAWINGS

Figure 2:
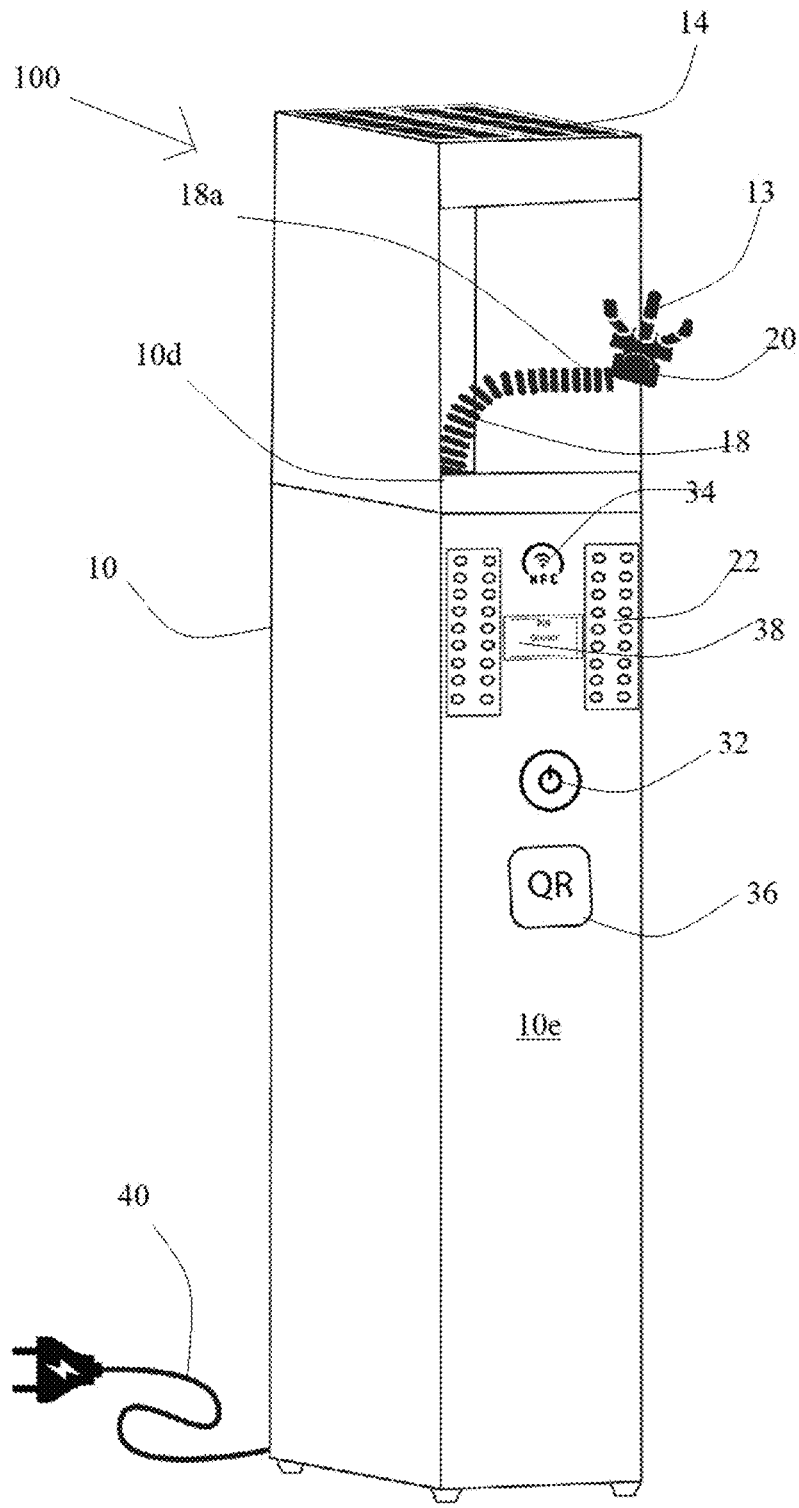

These and other features, aspects, and advantages of the present invention will become better understood with regards to the following description, appended claims, and drawings where:

FIG. 1 shows a perspective view of an open housing view of the selfi-device; and FIG. 2 shows a perspective view of the selfi-device.

DESCRIPTION

As seen in FIGS. 1-2, the present invention is a selfi-device 100 that allows a person to take a picture or video of him or herself at a remote and picturesque location.

The selfi-device 100 comprises of a housing 10 that has an upper side 10a, a lower side 10b, and at least one lateral side 10c. A solar photovoltaic system 12 that is housed within the housing 10 that defines at least one solar panel 14 on the upper side 10a of the housing 10. a motor 16 that is powered and that is operatively connected to the solar photovoltaic system 12, the motor 16 is housed within the housing 10. A retractable arm 18 that attaches to the motor 16, the retractable arm 18 extends outward from the housing 10 after passing through a through hole 10d defined on the housing 10. An articulated joint 20 that attaches to an end 18a of the retractable arm 18 not connected to the motor 16. An adjustable clamp 13 that attaches to the articulated joint 20. A light source 22 that attaches to an outer portion 10e of the housing 10. A processor 24 that is composed of a transceiver 26, a memory 28, and a program 30 that is configured to connect to a wireless network or satellite, the processor 24 is housed within the housing 10, the solar photovoltaic system 12 is operative connected to the motor 16, the light source 22, and the processor 24.

In an embodiment of the present invention, the selfi-device 100 further comprises of at least one input source 32 that will allow a user to activate the selfi-device 100.

In another embodiment of the present invention, the selfi-device 100 comprises of a payment input 34, the payment input 34 operative connects to the processor 24. The payment input can be a QR code 36 that is configured to be scanned to a user's cellphone so that the user can initiate a payment to use the selfi-device 100.

In yet, still another embodiment, of the present invention, the selfi-device 100 can further comprise of a passive infrared sensor 38 that is operative connected to the processor 24 and that is configured to allow a third party to monitor any activity near the selfi-device 100.

In a further embodiment of the present invention, the self-device comprises of a plugin power source 40 that operative connects to the light source 22, the motor 16, and the processor 24.

An advantage of the present invention is that it provides a selfi-device that allows you to take pictures of yourself at remote locations.

Another advantage of the present invention is that it provides a selfi-device that allows you to direct the picture of yourself taken at the remote location.

Yet another object of the present invention is that it provides a selfi-device that does not require you to have others take pictures of yourself at remote locations.

Yet still another object of the present invention is that is provides a selfi-device that records the place and time of wherein a user takes a picture and uploaded the picture to the cloud.

While the inventor's above description contains many specificities, these should not be construed as limitations on the scope of the selfi-device, but rather as an exemplification of several preferred embodiments thereof. Many other variations are possible. Accordingly, the scope should be determined not by the embodiments illustrated, but by the specification, the drawings, and the appended claims and their legal equivalents.

What is claimed is:

1. A selfi-device that allows a person to take a picture or video of him or herself at a remote and picturesque location, the selfi-device comprises of:
    a housing that has an upper side, a lower side, and at least one lateral side;
    a solar photovoltaic system that is housed within the housing that defines at least one solar panel on the upper side of the housing;
    a motor that is powered and that is operatively connected to the solar photovoltaic system, the motor is housed within the housing;
    a retractable arm that attaches to the motor, the retractable arm extends outward from the housing after passing through a through hole defined on the housing;
    an articulated joint that attaches to an end of the retractable arm not connected to the motor;
    an adjustable clamp that attaches to the articulated joint;
    a light source that attaches to an outer portion of the housing; and
    a processor that is composed of a transceiver, a memory, and a program that is configured to connect to a wireless network or satellite, the processor is housed within the housing, the solar photovoltaic system is operative connected to the motor, the light source, and the processor.

2. The selfi-device that allows a person to take a picture or video of him or herself at a remote and picturesque location of claim 1, the selfi-device comprises of at least one input source that will allow a user to activate the selfi-device.

3. The selfi-device that allows a person to take a picture or video of him or herself at a remote and picturesque location of claim 2, the selfi-device comprises of a payment input, the payment input operative connects to the processor.

4. The selfi-device that allows a person to take a picture or video of him or herself at a remote and picturesque location of claim 3, wherein the payment input is a QR code that is configured to be scanned to a user's cellphone so that the user can initiate a payment.

5. The selfi-device that allows a person to take a picture or video of him or herself at a remote and picturesque location of claim 1, the selfi-device comprises of a passive infrared sensor that is operative connected to the processor and that is configured to allow a third party to monitor any activity near the selfi-device.

6. The selfi-device that allows a person to take a picture or video of him or herself at a remote and picturesque location of claim 1, the selfi-device comprises of a plugin power source that operative connects to the light source, the motor, and the processor.

* * * * *